US007969986B2

United States Patent
Yanai et al.

(10) Patent No.: US 7,969,986 B2
(45) Date of Patent: Jun. 28, 2011

(54) METHOD AND DEVICE FOR USING A DATA OBJECT REPRESENTING A USER IN A DISTRIBUTED COMMUNICATION NETWORK

(75) Inventors: Shimon Yanai, Haifa (IL); Nir Dweck, Kadima (IL); Gil Zaidman, Kfar-Vitkin (IL)

(73) Assignee: Tadiran Telecom Ltd., Petach-Tikva (IL)

( * ) Notice: Subject to any disclaimer, the term of this patent is extended or adjusted under 35 U.S.C. 154(b) by 968 days.

(21) Appl. No.: 11/196,248

(22) Filed: Aug. 4, 2005

(65) Prior Publication Data

US 2006/0146800 A1 Jul. 6, 2006

(30) Foreign Application Priority Data

Dec. 30, 2004 (IL) .......................................... 166085

(51) Int. Cl.
*G08B 3/00* (2006.01)
(52) U.S. Cl. .................. 370/395.2; 370/395.1; 370/467; 370/465
(58) Field of Classification Search .................. 370/465, 370/467, 331, 351, 352, 389, 328
See application file for complete search history.

(56) References Cited

U.S. PATENT DOCUMENTS

| 6,373,817 B1 * | 4/2002 | Kung et al. .................. 370/217 |
| 6,463,446 B1 | 10/2002 | Wollrath et al. |
| 6,487,607 B1 | 11/2002 | Wollrath et al. |
| 6,598,094 B1 | 7/2003 | Wollrath et al. |
| 6,604,127 B2 | 8/2003 | Murphy et al. |
| 6,654,793 B1 | 11/2003 | Wollrath et al. |
| 7,209,970 B1 * | 4/2007 | Everson et al. ............... 709/229 |
| 2002/0069060 A1 * | 6/2002 | Cannavo et al. .............. 704/257 |
| 2002/0078153 A1 * | 6/2002 | Chung et al. ................. 709/204 |
| 2003/0058844 A1 * | 3/2003 | Sojka et al. ................... 370/352 |
| 2003/0108176 A1 * | 6/2003 | Kung et al. ............. 379/211.02 |
| 2004/0153473 A1 * | 8/2004 | Hutchinson et al. ........ 707/104.1 |
| 2005/0021695 A1 * | 1/2005 | Takamine ..................... 709/220 |

FOREIGN PATENT DOCUMENTS

| EP | 1 313 301 A | 5/2003 |
| WO | WO 02/084948 A | 10/2002 |

OTHER PUBLICATIONS

IEEE 100—The Authoritative Dictionary of IEEE Standards Terms Seventh Edition Standards Information Network/IEEE Press Published Dec. 2000 pp. 752.*
http://www.sun.com/software/jinni/whitepapers/jinni-execoverview.pdf, "JiniTM Network Technology" An executuve Overview, pp. 1-16, Feb. 2001.
M. Handley et al., "RFC 2543 SIP: Session initiation Protocol" IETF Standard, Internet Engineering Task Force, IETF, CH, pp. 1-153, Mar. 1999, XP015008326.

* cited by examiner

*Primary Examiner* — Daniel Wu
*Assistant Examiner* — Frederick Ott
(74) *Attorney, Agent, or Firm* — Browdy & Neimark, PLLC

(57) ABSTRACT

A method and device are provided for conducting a media communication session with at least one user presented by at least one data object, where the data object resides at a plurality of platforms associated with a distributed IP communication network. The media communication session is established following the initiation of a request to establish that session, where the request identifies the at least one data object but does not specify any communication device through which that media communication session will be established.

20 Claims, 2 Drawing Sheets

METHOD AND DEVICE FOR USING A DATA OBJECT REPRESENTING A USER IN A DISTRIBUTED COMMUNICATION NETWORK

FIELD OF THE INVENTION

This invention generally relates to distributed systems and, more particularly, to a method and apparatus for using data objects in a distributed system.

BACKGROUND OF THE INVENTION

In traditional telecommunication networks, when a party wishes to establish a communication session with another party, that first party should be familiar with the address of the other party, e.g. a telephone number, an IP address etc., and the user is limited in his ability to establish that communication session to the telephone number dialed, or to the computer where he has currently logged with that IP address specified in the request to establish the session. In other words, in typical prior art systems, each user has one or more identifiers so that once he/she logs in, the system would be able to associate the user with the device logged in. Usually, each device is associated with a pre-determined subscriber, so once the device's number is called, or the log-in address is requested for establishing communication, the system identifies the subscriber by the default number/log-in address, and either makes the connection, or if the subscriber has requested prior to that time to forward the calls (e.g. by defining a "follow-me" address), the system will either transfer the call to that address.

This restriction also characterizes distributed type of systems that have been gaining certain popularity in the recent years. Such distributed systems typically comprise multiple machines, such as computers and other peripheral devices, connected in a network, such as, a Local Area Network ("LAN"), Wide Area Network ("WAN"), or the Internet. Typically, distributed systems require that computational entities (e.g., applications, programs, etc.) running in different address spaces, on different or the same platforms, be able to communicate with each other.

For a basic communication mechanism, distributed systems utilize communication between applications residing in different address spaces. As to the establishing and conducting communication sessions with users of distributed systems, various proposals were made. One such proposal is described in our co-pending application IL 164,577, which describes a method for conducting a real-time, voice over IP media type of communication session between two peer users (or more) by providing at least one replication of a data object to all other platforms associated with the distributed communication network and notifying all these platforms of the creation (or modification) of that data object.

Thus, in distributed systems, the request to establish a call would arrive at the network space to an object associated with the user, irrespective of whether the requested call is eventually established or not. The user will then be able to draw messages or establish calls, but only through the device on which he/she is registered.

As these solutions bear an impact upon the flexibility of the users, e.g. if they may move around the organization they belong and still remain in communication if required, other better suited solutions are required.

SUMMARY OF THE INVENTION

Thus, one of the objects of the present invention is to provide a solution for establishing and carrying out a media call, where the participants are connected to a distributed network, and in which users are not confined to the device on which they connected to the network.

Another object of the present invention is to provide a solution to enable an object presenting a user to determine the device by which that user shall conduct the requested communication session.

Additional objects and advantages of the invention will be set forth in the description which follows, and in part will be obvious from the description, or may be learned by practice of the invention. The objects and advantages of the invention may be realized and obtained by means of the instrumentality and combinations particularly pointed out in the appended claims.

According to a first aspect of the present invention there is provided a method for conducting a media communication session with at least one user represented by at least one data object residing at a plurality of platforms associated with a distributed IP communication network, wherein a request to establish said communication session includes identification of said at least one data object and does not specify a communication device associated with said distributed IP communication network for establishing said communication session. By this embodiment a person initiating a communication session with that at least one user would address the object located at the distributed IP communication network, irrespective of the communication device (e.g. the telephone number) that will eventually be used by that at least one user in this particular communication session.

Preferably, the media communication session is a member of the group consisting of: data communication session, voice communication session, video communication session, facsimile communication session, or any combination thereof.

According to a preferred embodiment of the invention, the at least one data object determines which one or more communication devices will be used for conducting said communication session.

By yet another embodiment of the invention, the method further comprises a step of providing a notification at one or more communication devices associated with the at least one user, in response to receipt of that request.

Preferably, following receipt of the notification, the at least one user is allowed to select at least one communication device through which the communication session will be established. Still preferably, the at least one user is provided with the option to transfer and continue the communication session by using another communication session associated with that at least one user. The following could be regarded as an example demonstrating this embodiment. Let us assume that a voice call was established and is now being held between two parties. Now suppose that for some reason they decide to switch to a videoconference, which cannot be held using the devices currently in use for the call (at least for one the users). Thus, according to this embodiment of the invention, that user may transfer the call to another device having the proper feature, i.e. enable conducting a video session, without having to disconnect the communication session that started as a voice call.

In accordance with yet another embodiment of the invention, the communication session is a real-time, voice over IP media type of communication session conducted between at least two data objects each presenting a peer user and each of said at least two data objects is associated with a platform comprised in a distributed IP communication network.

According to yet another embodiment of the invention, the method further comprises a step of providing at least one replication of at least one data object to all other platforms associated with the distributed communication network.

By yet another embodiment of the invention, the method further comprises a step of providing a notification at all platforms associated with the distributed communication network, indicating the creation or modification or deletion of the at least one data object.

In accordance with another embodiment of the invention there is provided a method that comprises the following steps:

defining the at least one user at the distributed IP communication network;

at at least one platform associated with the at least one user, creating at least one data object which presents the at least one user;

providing a replication of the at least one data object to all other platforms associated with the distributed IP communication network;

receiving a request to establish a communication session with said at least one user, which identifies said at least one data object;

determining whether the at least one user is associated with one or more communication devices that have already been registered at said distributed IP communication network, and if in the affirmative, determining through which of these one or more communication devices, will the communication session be established with said at least one user; and establishing said communication session. By still another embodiment of the invention, all messages exchanged prior to establishing the communication session, are exchanged in an encrypted form that can be decrypted by entities to which the messages are directed.

According to yet another embodiment, the method further comprises a step of providing the at least one data object with information regarding the communication session to be established, and wherein the information provided enables the at least one data object to determine one or more communication devices out of a plurality of communication devices associated with the distributed IP communication network, through which that particular communication session shall be conducted.

In accordance with another embodiment of the invention, the request to establish the communication session identifies at least one data object representing at least one user who may currently not be associated with any of the communication devices associated with the distributed IP communication network, e.g. when the at least one user is not logged in at any of the communication devices associated with the distributed communication network, at the time when the request is received at the distributed communication network. One of the options provided by present invention in such a case is that a message which relates to the request communication session (e.g. the request that should be received by that user) will be stored, and preferably, at a later stage, when the at least one user eventually logs in, the message will be displayed at the communication device at which the at least one user has just logged in. Alternatively or in addition, the at least one user will receive at that stage an indication that a message is waiting for him/her. Another example for such a message may be a message that comprises an option to link the at least one user with the initiator of the present request, or any other type of message known in the art per se.

By another embodiment of the present invention, the method provided may be used in forwarding requests to establish communication sessions (e.g. calls) irrespective whether or not the user is currently logged in at the distributed IP communication network. According to this embodiment once a request to establish the communication session, reaches the data object that represents that user, it will be forwarded, e.g. to another data object in accordance with at least one pre-defined management rule. As will be appreciated, different rules may apply to different situations, e.g. whether or not the user is logged in to one of the communication devices associated with the distributed network, depending on the time of the day, depending whether it is a holiday, etc.

In accordance with still another embodiment of the present invention, the method provided may be used in monitoring the user's state (e.g. presence), irrespective of whether that user is currently logged in or not at the distributed IP communication network. By this embodiment the request to establish the communication session is a request to receive notifications relating to the status of that user, and the party making this request, provided of course it has the authority to make such a request, will receive a notification whenever there is a change in the state of the user.

In accordance with another aspect of the invention, there is provided a computer-readable medium comprising instructions that perform a method, when executed by a processor, for conducting a media communication session with at least one user presented by at least one data object residing at a plurality of platforms associated with a distributed IP communication network, wherein a request to establish said communication session includes identification of said at least one data object and does not specify a communication device associated with said distributed IP communication network for establishing said communication session. Preferably, the at least one data object determines which one or more communication devices will be used for conducting said communication session. According to another embodiment of this aspect of the invention, the at least one user selects said at least one communication device through which said communication session will be established, from among one or more communication devices associated with said at least one user.

According to still another embodiment of the invention, the computer-readable medium comprises instructions that perform a method, when executed by a processor, for conducting a media communication session with at least one user presented by at least one data object located at a distributed IP communication network space, by:

defining the at least one user at the distributed IP communication network;

at least one platform associated with the at least one user, creating a data object which represents the at least one user;

providing a replication of the data object to all other platforms associated with the distributed IP communication network;

receiving a request to establish a communication session with said at least one user, which identifies said at least one data object;

determining whether the at least one user is associated with one or more communication devices that have already been registered at said distributed IP communication network, and if in the affirmative, determining through which of these one or more communication devices, will the communication session be established with said at least one user; and establishing the communication session.

By yet another aspect of the invention, there is provided a distributed IP communication system comprising:

a first communication platform including an object; and a second communication platform including:

a process configured, when executed by a processor, to establish a communication session with an object residing at the first communication platform, by:

providing a replication of the object to first communication platform;

invoking at the first communication platform, a process for:

a) determining whether at least one user represented by that object is associated with one or more communication devices that have already been registered at the distributed IP communication network; and b) if in the affirmative, determining a communication device at which the communication session will be established with the at least one user; and establishing said communication session.

In accordance with this embodiment of the invention, the second communication platform can also be the very same first communication platform, hence this option should be understood to be encompassed by this embodiment of the present invention.

By yet another aspect of the invention, there is provided for use in a distributed IP communication system, an object comprising one or more commands adapted to activate a platform to carry out instructions for conducting a communication session with at least one user, wherein the object is operative to select at least one communication device out of a plurality of communication devices associated with the distributed IP communication session, through which the communication session will be conducted, in response to receiving a request to conduct a communication session with that data object.

BRIEF DESCRIPTION OF THE DRAWINGS

A better understanding of the present invention is obtained when the following non-limiting detailed description is considered in conjunction with the following drawings in which.

DETAILED DESCRIPTION OF THE INVENTION

Reference will now be made in detail to an implementation consistent with some embodiments of the present invention as illustrated in the accompanying drawings.

Systems operative in accordance with the present invention are adapted to operate as a distributed system. The term "remote" is used herein to distinguish between an object located in an address space designated for a machine operating in association with a computational entity and an object located in an address space that is different from the address space designated for a machine operating in association with the computational entity, the latter situation representing a "remote" object. Consequently, an object located on the same physical machine as a computational entity can be considered a "remote" object with respect to that entity provided the computational entity uses an address space different from the space holding the object.

Figure 1:
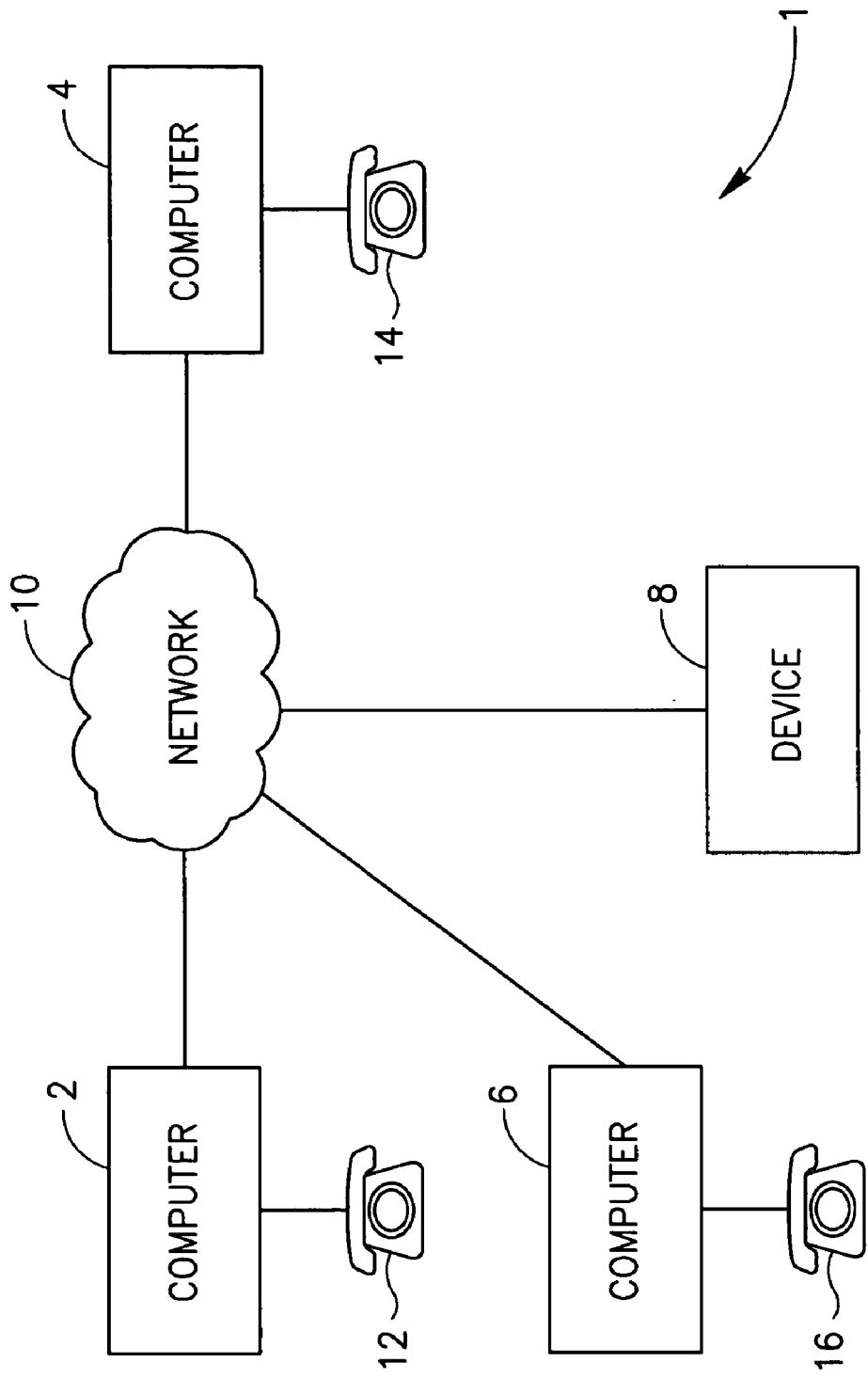
FIG. 1 illustrates an example of a network architecture in which systems according to an embodiment of the present invention may be implemented.

Methods and systems consistent with the present invention operate in distributed systems comprised of, for example, multiple machines. An exemplary distributed system is shown in FIG. 1. This distributed system is generally comprised of various components, including both hardware and software. The exemplary distributed system (a) allows users of the system to share services and resources over a network of many devices; (b) provides programmers with tools and programming patterns that allow development in distributed systems; and (c) simplifies the task of administering the distributed system. To accomplish these goals, the distributed system utilizes a programming environment that allows both code and data to be moved from device to device in a seamless manner. Accordingly, the distributed system is layered on top of the programming environment, including the security offered by it.

In the exemplary distributed system, different computers and devices are associated with what appears to the user to be a single system. By appearing as a single system, the distributed system provides the simplicity of access and the power of sharing that can be provided by a single system without giving up the flexibility and personalized response of a personal computer or workstation. The distributed system may contain a large number of devices operated by users who are geographically disperse, but who share basic notions of trust, administration, and policy.

Distributed system 1 exemplified in FIG. 1 comprises computers 2, 4 and 6, their respective IP telephones 12, 14 and 16 connected thereto and device 8 interconnected by a network 10, and sharing an address space. Device 8 may be any of a number of devices, such as a printer, fax, storage device, or other devices. Network 10 may be a LAN, WAN, or the Internet. Although only three computers and one device are depicted as comprising distributed system 1, one skilled in the art will appreciate that such a distributed system typically includes additional computers and devices or even computers alone without any devices.

When a new user is about to use the distributed IP communication network of the present invention, he/she will be first defined at the network space, and a data object presenting that user shall be established.

In a somewhat similar way, upon connecting any of the devices to the address space, each such device is registered to receive notifications on all messages directed to its address. The typical mode of communication is by having a registered device, say computer 2, sending an object (e.g. a template) to the address space, where preferably that object comprises an indication identifying its sender (user of computer 2). When a request to establish a communication session, e.g. a call, is sent to the address space either by another device associated with that space (e.g. by computer 4) or from out of that space, a notification is received by device 2, indicating that a message was sent to device 2.

Let us now assume that a voice call is to be established between a user B connected to computer 4 via telephone 14 and user A. User B will input a code identifying user A with whom the call is to be established (e.g. input a request indicating that B wants to establish a call with user A). This input initiates an event, which in turn is replicated at all other machines associated with the distributed system. If user A has not yet logged in at any of the devices associated with the network, and no forwarding rule has been determined for cases where a call to user A arrives but user A is not logged in, the request initiated by B will either be declined by the object presenting user A, or a message will be stored at A's object to denote the event that B was looking to establish a call with A. Now assume that user A arrives and logs in at one or more of devices associated with network 10. A notification will then be sent by the object to all the devices that are now associated with user A, or in the alternative to one pre-defined leading device (e.g. where user A has been registered at). Once user A is made aware of that notification, by the device (2) he/she is currently using, or is about to use, he/she will in turn send a message (an object) via that device (computer 2) to the address space, such as "make call (12)". When this object is received at the address space, computer 2 will be notified of the receipt of this object. Upon receipt of the object by computer 2, a control command "ring" will be forwarded to telephone set 12. From telephone 12, a return message (e.g. "alert") is sent to the address space, received by device 4, and interpreted for the user's telephone associated with computer 4 as a ring back tone. Once user of telephone 12 accepts the call (e.g. by lifting the telephone handset) a connection is established and the call is made as a VoIP call as known per se in the art.

However, one of the drawbacks associated with such a distributed system is the fact that all of the process of establishing the call is conducted in the address space in a manner as described above, where each of the devices that are connected to that space are exposed to the information exchanged. Let us now consider a case where the user of telephone 16 is interested in intercepting, or listening, to the call destined to the user of telephone 14. In such a case, computer 6, where user A may also be registered and hence receive the replication, may share that call as a listener, while the two genuine parties users of telephones 12 and 14, are unaware of its presence. In a more severe situation, computer 6 after communicating with the system and receiving a proxy to be connected thereto, will be registered in the space under an assumed name (e.g. as computer 4), and will receive the notifications and/or messages destined to computer 4, and act thereupon.

In order to prevent such unauthorized misuse of the system, the following exemplifies a method conducted in accordance with another embodiment of the present invention. In accordance with this example, at the first opportunity, preferably when a new device joins the network and is accepted as an entity that shall have an access to the address space, that device is provided with a code that is unique in the distributed system, and will be reserved thereafter for that device ("private code"), also another code is defined in the system for that specific device. This other code is provided to all other devices associated with this distributed system ("public code"). Preferably, when all other devices are notified about the joining of that new device to the system, they are also provided with the public code of this new device.

Now, let us consider once again a case where a call is to be established between user B using telephone 14 connected to computer 4 and user A registered on telephone 12 which is connected to device 2, while ensuring that the user associated with computer 6 is unable to join that call. The user of telephone 14 inputs again a code identifying user A with whom the call is to be established. This input initiates an event, so that an event notification is sent to computer 4. In response, computer 4 will now send a message (an object) to the address space, e.g. "make call (12)", but this time the message will be encrypted with the public code applied in the system. When the encoded object is received at the address space, all devices will make an attempt to decrypt it, but only devices associated with user A's data object, e.g. computer 2, will have the private code to enable them to decrypt that message and act thereupon. The rest of the process may be carried out in a way similar to that described above, with the difference that the messages leading to the establishment of the call are encrypted by both parties (2 and 4) by the method described so that no other entity may gain a knowledge of the call that is about to be established.

Figure 2:
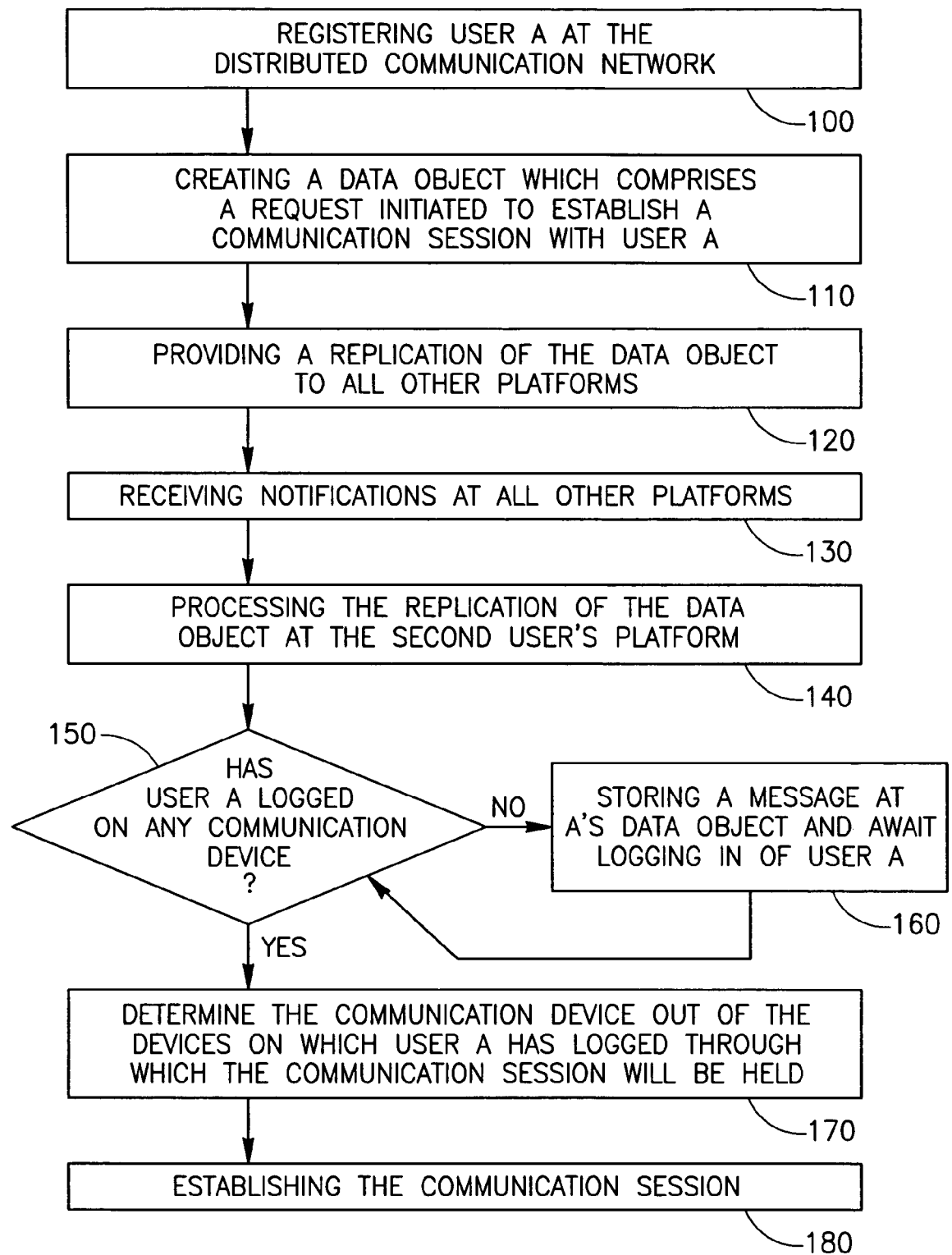
FIG. 2 is a flow chart diagram illustrating a data flow for establishing a communication session in a distributed system in accordance with an embodiment of the present invention.

Let us turn now to FIG. 2 which is a flow chart diagram illustrating a method according to an embodiment of the present invention for establishing a communication session in a distributed in accordance with an embodiment of the present invention. In step 100, user A is registered at the distributed communication network and is provided with a data object that represents that user. As will be appreciated by those skilled in the art, the registration may be either just before establishing the session, or any time before that. The registration process comprises associating the user with one or more appropriate data object(s) and replicating the data object(s) in all the platforms that belong to the distributed communication network. Next, by step 110, a data object, which comprises a request initiated either by another peer user (or by a user not belonging to the distributed communication network) is placed at the address space, while identifying user A. Then, a replication of the request's data object is sent to all other platforms associated with the distributed communication network (step 120). Thereafter, a notification is sent at all platforms indicating the creation or modification (during the communication session) of the request's data object (step 130).

Next (step 140), a replication of the request's data object is received and processed by the appropriate computational entities.

Thereafter, a check is conducted to confirm whether user A is logged on any of the communication devices associated with the distributed network (step 150). If no such a device is found, a message is stored at the data object presenting user A (step 160), and whenever user A will eventually log on one or more of the devices, the message will be displayed.

If it is found that user A is logged in one or more of the devices, the data object associated with user A determines (step 170), based on various inputs, such as which of the network's devices are currently associated with user A, the type of the session requested that should be compatible with the device determined, etc., and the device which shall be used to establish the requested communication session. Upon sending a response to the space address, a communication session is established (step 180).

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined by the claims that follow:

The invention claimed is:
1. A method for conducting a media communication session, comprising:
providing a plurality of identical data objects, all of which stores data that includes an identification of a single user,
distributing said plurality of identical data objects within a distributed IP communication network so that they each reside at a different platform associated with the distributed IP communication network,
making all of said plurality of identical data objects associated with said single user available for concurrent use and causing all of said plurality of identical data objects to exist in said distributed IP communication network irrespective of whether said respective single user is actively connected to any device belonging to said network, and
sending a request to establish said media communication session that includes identification of said plurality of data objects and does not specify a communication device associated with said distributed IP communication network for establishing said media communication session.

2. The method according to claim 1, wherein said media communication session is a member of the group consisting of: data communication session, voice communication session, video communication session, and facsimile communication session.

3. The method according to claim 1, wherein said plurality of data objects determines which one or more communication devices will be used for conducting said media communication session.

4. The method according to claim 1, wherein said single user transfers the media communication session to another communication device associated with said single user.

5. The method according to claim 1, wherein said media communication session is a real-time, voice over IP media type of communication session conducted between at least two data objects each presenting a peer user and each of said at least two data objects is associated with a platform comprised in the distributed IP communication network.

6. The method according to claim 1, further comprising a step of providing a notification at all platforms associated with said distributed IP communication network, indicating the creation, modification or deletion of said plurality of identical data objects.

7. The method according to claim 1, comprising the steps of:
defining said single user at the distributed IP communication network;
at one platform associated with said single user, creating the at least one data object which represents said single user;
providing a replication of each of said at least one data object to all other platforms associated with said distributed IP communication network;
receiving a request to establish the media communication session with said single user, which identifies said at least one data object;
determining whether said single user is associated with one or more communication devices that have already been registered at said distributed IP communication network, and if in the affirmative, determining through which of said one or more communication devices, will the media communication session be established with said single user; and
establishing said media communication session.

8. The method according to claim 1, wherein at least most of the messages exchanged prior to establishing said media communication session, are exchanged in an encrypted form that can be decrypted by entities to which said messages are directed.

9. The method according to claim 1, further comprising a step of providing said at least one data object with information related to the media communication session to be established, and wherein said information allows at least one data object of said plurality of identical data objects to determine which one or more communication devices will be selected for carrying out said media communication session, out of said plurality of communication devices.

10. The method according to claim 1, wherein said request to establish said media communication session identifies at least one data object out of said plurality of identical data objects representing the single user and wherein said single user is not currently associated with any communication device associated with said distributed IP communication network.

11. The method according to claim 10, further comprising a step of storing a message related to said request to establish said media communication session with said single user.

12. The method according to claim 11, further comprising a step of displaying said message or an indication thereof, upon association of said single user with a communication device associated with said distributed IP communication network.

13. The method according to claim 10, further comprising a step of forwarding said request to establish said media communication session, in accordance with at least one predefined management rule.

14. The method according to claim 10, wherein said request to establish said media communication session is a request to receive notifications relating to the status of said single user.

15. A non-transitory computer-readable medium encoded with instructions capable of being executed by a computer that perform a method, when executed by a processor, for conducting a media communication session, comprising:
providing a plurality of identical data objects, all of which stores data that includes an identification of a single user,
distributing said plurality of identical data objects within a distributed IP communication network so that they each reside at a different platform associated with the distributed IP communication network,
making all of said plurality of identical data objects associated with each of said single user available for concurrent use and causing all of said plurality of identical data objects to exist in said distributed IP communication network irrespective of whether said single user is actively connected to any device belonging to said network, and
sending/receiving a request to establish said media communication session includes identification of said plurality of data objects and does not specify a communication device associated with said distributed IP communication network for establishing said media communication session.

16. The non-transitory computer-readable medium according to claim 15, wherein at least one data object of said plurality of data objects determines which one or more communication devices will be used for conducting said media communication session.

17. The non-transitory computer-readable medium according to claim 15, wherein said single user selects at least one communication device through which said media communication session will be established, from among one or more communication devices associated with said single user.

18. The non-transitory computer-readable medium according to claim 16, wherein said media communication session is a real-time, voice over IP media type of communication session.

19. A non-transitory computer-readable medium encoded with instructions capable of being executed by a computer that perform a method, when executed by a processor, for conducting a media communication session with at least one user represented by a plurality of identical data objects located at a distributed IP communication network space, by:
defining said at least one user at the distributed IP communication network;
at one platform associated with said at least one user, creating a data object which stores data that includes an identification of said at least one user;
providing an identical replication of said data object to each of all other platforms associated with said distributed IP communication network, wherein all of said plurality of identical data objects associated with each of said at least one user, are available for concurrent use and exist in said distributed IP communication network irrespective of whether said respective at least one user is actively connected to any device belonging to said network;

receiving a request to establish a communication session with said at least one user, which identifies said plurality of data objects;

determining whether said at least one user is associated with one or more communication devices that have already been registered at said distributed IP communication network, and if in the affirmative, determining through which of said one or more communication devices, will said communication session be established with said at least one user; and establishing said communication session.

20. A distributed IP communication system comprising:

a first communication platform including a data object which stores data that includes an identification of a single user; and a second communication platform including:

a processor configured to establish a communication session with the object residing at said first communication platform, by:

providing a replication of said data object wherein said data object and the replication thereof are associated with said single user and are available for concurrent use and exist in said distributed IP communication network irrespective of whether said respective single user is actively connected to any device belonging to said system;

invoking at said first communication platform, a process for:
 a) determining whether a single user represented by said data object is associated with one or more communication devices that have already been registered at said distributed IP communication system; and
 b) if in the affirmative, determining a communication device at which said communication session will be established with said at least one user; and establishing said communication session.

* * * * *